United States Patent [19]

Cooper

[11] 4,118,135
[45] Oct. 3, 1978

[54] PRE-STRESSED ROD JOINT

[75] Inventor: Roy F. Cooper, Downey, Calif.

[73] Assignee: Sargent Industries, Huntington Park, Calif.

[21] Appl. No.: 793,090

[22] Filed: May 2, 1977

Related U.S. Application Data

[63] Continuation of Ser. No. 649,978, Jan. 19, 1976.

[51] Int. Cl.² .............................................. B25G 3/02
[52] U.S. Cl. .................................... 403/361; 403/343; 403/112
[58] Field of Search ............... 403/343, 361, 369, 305, 403/306, 296, 112, 211, 212, 220, 333, 334, 340, 341, 355; 285/390

[56] References Cited

U.S. PATENT DOCUMENTS

| | | | |
|---|---|---|---|
| 1,127,022 | 2/1915 | Knight | 403/73 |
| 2,574,648 | 11/1951 | Mason | 403/182 |
| 2,852,281 | 9/1958 | Ellis | 285/89 |
| 3,079,180 | 2/1963 | Lyon | 285/220 |
| 3,346,935 | 10/1967 | Lyon | 29/157 R |
| 3,463,518 | 8/1969 | Broussard et al. | 285/340 |
| 3,466,009 | 9/1969 | Giles | 251/337 |

Primary Examiner—Wayne L. Shedd
Attorney, Agent, or Firm—Ellsworth R. Roston

[57] ABSTRACT

A rod joint in which the entire threaded length connection between two substantially straight rods, without shoulders, is pre-stressed, including a split, sectioned ring which fits between preformed seats on each of the rod elements.

16 Claims, 3 Drawing Figures

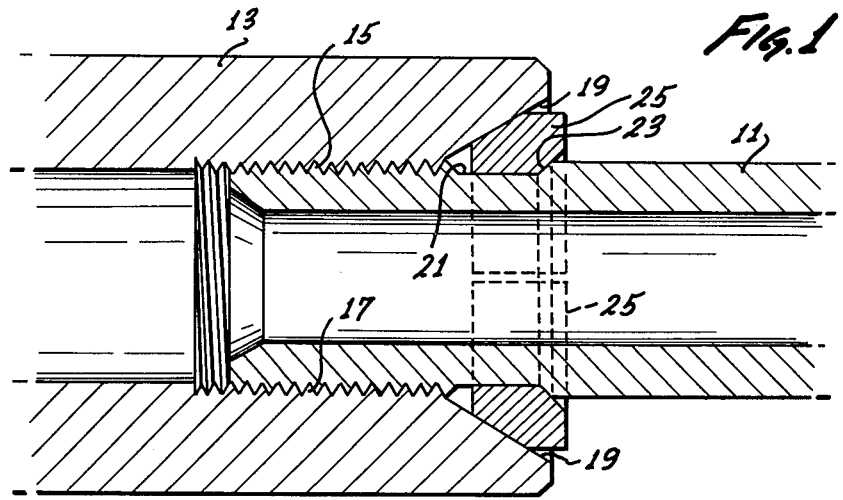
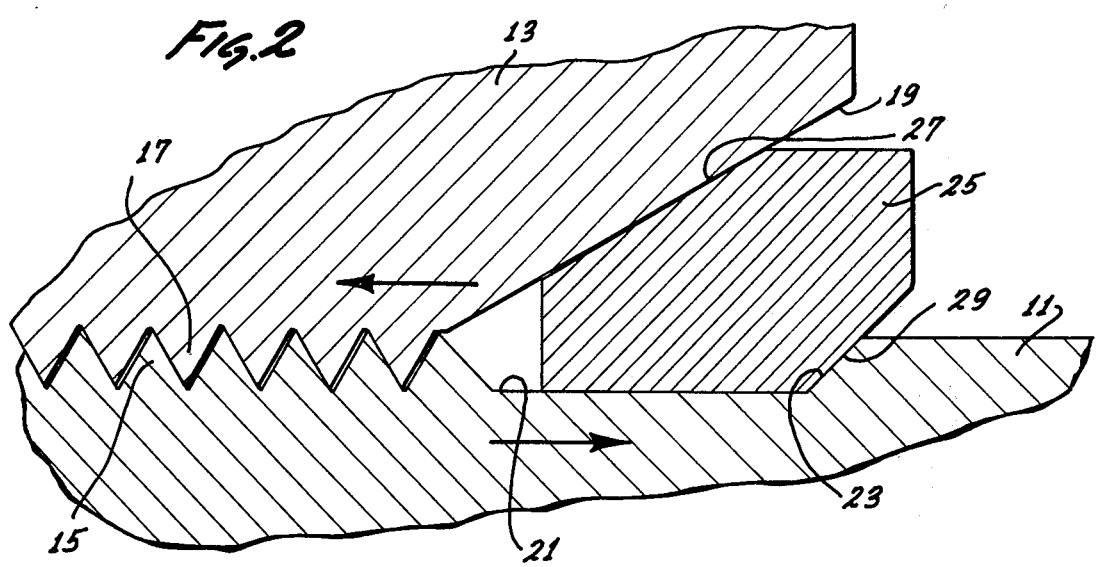
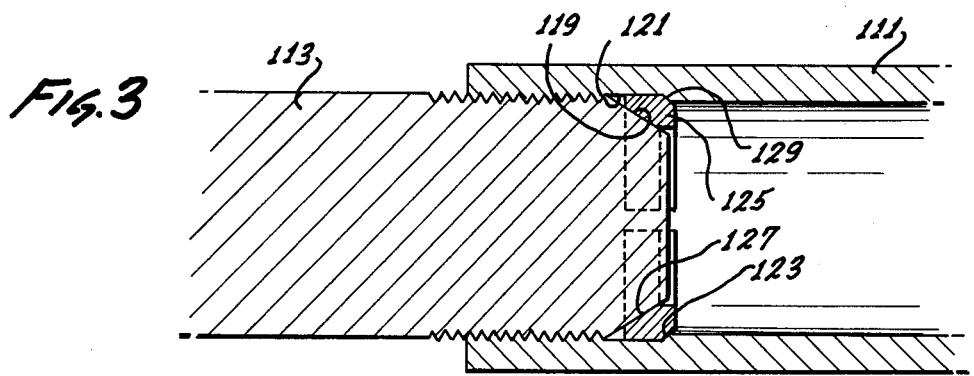

PRE-STRESSED ROD JOINT

This is a continuation of application Ser. No. 649,978 filed Jan. 19, 1976.

BACKGROUND OF THE INVENTION

In most cases of moving machinery, mechanical joints formed by various structural elements are subjected to cyclic stress. In the greater majority of cases, the cyclic stresses are relatively small and no substantial fatigue or failure results. In some instances, however, the cyclic stresses can be so large, or can be imposed upon the materials for so long, that fatigue will result. This is especially true if the parts are so constructed as to have a notch, thread, or any abrupt change in cross-section. The maximum stress will occur at that location and will be greater than the nominal stress in the part. In fact, it has been found that threads are often the location at which fatigue failure first occurs as a result of the stress concentration factor.

It has been known for sometime that cyclic stress fatigue could be substantially eliminated by pre-stressing the parts to an extent that the pre-stress imposed is greater than any stress which might be imposed by cyclic operation of the machinery. For example, the parts may be threaded together using a torque wrench to insure that the maximum cyclic stress is exceeded by the imposed pre-stress.

In pre-stressing relatively threadable members, there are two major problems which have not been solved by the prior art devices. In nearly all such devices, it has been necessary to provide a shoulder on either or both of the members in order to produce a sufficient reaction force to generate the pre-stress. Of course, if it is feasible to employ such a shoulder—for example, the head of a bolt—imposing a pre-stressing force becomes a rather simple matter.

On the other hand, it is often necessary to join straight, threaded members in a pre-stressed joint without being able to employ a shoulder against which the joint may be pre-stressed. For example, the joined rods may have to be movably installed in a fairly close fit within another structural element. Unfortunately, if no shoulder can be used to impose pre-stress forces, the last threads of the joint can rarely, if ever, be subjected to the entire pre-stress force. Consequently, the cyclic stresses applied in the vicinity of the last thread may equal or exceed any pre-stress, increasing the chances of failure.

BACKGROUND OF THE INVENTION

Thus, it is desirable to provide a tool or rod joint which can be pre-stressed throughout the entire length of the joint so that the pre-stress forces are larger than any cyclic force which will be imposed upon the structure. Further, it is desirable to form such a device so that there is no abrupt change in cross-section. Similarly, it is preferred to form the joint in such a manner that every thread in the joint is subjected to the pre-stress force, thus substantially eliminating the possibility of fatigue failure in the joint. Such a joint may be employed, for example, in the structure of the hydraulic motor and pump disclosed in U.S. Pat. No. 3,502,020, assigned to the assignee hereof.

On its presently preferred embodiment, the invention utilizes a small recessed or beveled section adjacent one end of the thread on one of the elements to be joined, and a similar structure at the opposite end of the threads on the second element to be joined. For the sake of convenience, these recesses or beveled sections shall be referred to as a seat. Between the seating means on the two elements, sections of split ring can be installed which cooperate to exert reaction forces on the elements to be joined. Surprisingly, it has been determined that a joint formed in accordance with the present invention may be stronger than the elements themselves. In other words, failure is more likely elsewhere in the structure than it is at the joint. Further, the present invention allows the joint to be utilized, as stated previously, without requiring a shoulder to be formed on either of the devices, thereby reducing the size and mass of the overall machine.

Those skilled in the art will realize that the present invention can be employed in a wide variety of structures. For example, either or both of the elements to be joined may be solid or hollow. Similarly, the invention could be employed with structure in the nature of a stud which is threaded into a machine body. In any event, these and many alternative uses of the invention as defined in the claims will quickly become apparent to those skilled in the art without exceeding the scope of the invention as thus defined.

BRIEF DESCRIPTION OF THE DRAWING

FIG. 1 comprises a sectional illustration of a joint formed in accordance with the present invention.

FIG. 2 comprises a greatly enlarged sectional view of a portion of the device illustrated in FIG. 1; and FIG. 3 comprises an alternate embodiment of a rod joint formed in accordance with the present invention.

DETAILED DESCRIPTION

As shown in FIG. 1, a first preferred embodiment of the present invention may be employed for operatively connecting a pair of tubular elements 11 and 13 having cooperable threads 15 and 17, respectively.

At one end of the member 13, adjacent the outer end of the thread 17, a beveled or sloped seating surface 19 may be provided on a suitable angle, as will be described below. Adjacent the inner end of the thread 15 and member 11, a recess 21 may be provided, having a sloped seating surface 23.

Intermediate the seats 19 and 23, a plurality of sections 25 may be installed in a ring. Preferably the ring sections each have sloped seating surfaces 27 and 29. As the elements 11 and 13 are threaded together, the ring sections having been installed, the seating surfaces 19 and 27 will interact, as will the seating surfaces 23 and 29, to exert a pre-stress between the parts. As illustrated in FIG. 1, this action will draw the threads together at the mating surfaces closest to the ring 25, leaving a slight clearance, or lower frictional contact, on the opposite side of the threads. In other words, as the elements are threaded onto one another and the ring interacts between the surfaces 19 and 23, reaction forces will be exerted upon the elements in the directions of the arrows illustrated in FIG. 2. Thus, the ring sections will be captured between the pieces and exert pre-stressing reaction forces thereon, without requiring in either part a shoulder above the tubular portions of the members 11 and 13. As a result, stress concentration factors will be minimized and the pre-stress force will be exerted over the entire length of the threaded joint.

Those skilled in the art will realize that the opening bore in the member 13 could, if desired, comprise a straight bore and a sloping surface 19 would not be required to generate the desired reaction forces since the ring sections could act against the bottom of the bore. It will also be clear to those skilled in the art however, that a sloped surface is preferable in the interaction between the ring and the element 11, as illustrated at 23 and 29. With respect to these alternatives, the sloped seating surface 19 in the element 13 is desired because the use of such a cooperative arrangement eliminates close tolerance requirements which could be generated by the use of a straight bore having a radial surface adjacent the end of the screw 17.

Those skilled in the art will also realize that, if desired, the recess 21 in the element 11 could be produced so that it is radially smaller, relative to the axis of element 11, than the root of the thread 15.

In any event, it has been found that the specific angle selected for the cooperative relationship of surfaces 23 and 29 is unimportant, so long as the angle is selected from within a suitable range of angles. In this regard, when the tangent of the angle of the surfaces 23 and 29, relative to the axis of the element 11, approaches the coefficient of friction between element 11 and the ring 25, it will be impossible to cause relative rotation between those parts sufficient to generate the pre-stressing reaction forces. For the sake of convenience, and since the precise lower angle cannot be specifically determined for all materials and combinations thereof, in view of the different coefficients of friction, the angle of which the tangent is approximately equal to the coefficient of friction will be referred to here as the "sticking angle."

Thus, when the angular relationship of the sloped surfaces 23 and 29 reaches the sticking angle, relative to the axes of the joint elements, sufficient relative rotation therebetween cannot be obtained to accomplish pre-stressing in accordance with the result desired from the present invention. On the other hand, if close tolerance requirements are considered to be unimportant, it will be realized that the invention could be employed under circumstances in which the surfaces 23 and 29 are radially oriented, relative to the joint elements.

Referring now to FIG. 3, there has been illustrated a second embodiment of the present invention, in which elements which are similar to the first embodiment have been provided with the same identification numerals, preceded by the numeral "1". Thus, sloped surface 29 of the first embodiment is illustrated as sloped surface 129, etc. The second embodiment clearly illustrates that the inventive concept can be employed in a variety of structures. Thus, in the second embodiment, the ring 125 is employed on the end of the inner element 113 against a groove 121 in the outer element 111. In other words, the various sloped surfaces, etc., can be formed on either of the elements to be joined in such a way as to create the desired pre-stress force in the element which is larger than any anticipated or potential cyclic stress. Thus, both elements can be hollow or tubular, either or both can be solid, etc. Similarly, the invention can be employed with structural elements of quite different sizes, or even in place of the prior art, shouldered structures, if desired.

As a result of this structure, the joint itself, comprising the two elements to be joined and the ring sections, is stronger than either of the elements which are joined. Thus, the possibility of fatigue failure in the area of the joint is significantly reduced or eliminated entirely.

Those skilled in the art, having read the above description, will quickly be able to employ this concept, as defined by the claims, in a wide variety of structures, many of which will not even resemble those depicted in the drawing. Of course, all such structures should be considered to fall within the scope of this invention as defined by the claims.

I claim:
1. In combination in a rod joint pre-stressed to eliminate fatigue due to cyclic stress imposed upon the rod joint,
   a first rod member having
      an external surface and
      a threaded bore and
      a seating surface disposed at one end of said bore and extending outwardly from the threaded bore,
   a second rod member having
      a threaded external surface disposed in cooperative relationship with the threads in first rod member and having a second surface displaced from the threaded external surface and having external dimensions corresponding to those of the threaded external surface and having a seating surface disposed at one end of the second rod member between the threaded external surface and the second surface and in displaced relationship to the seating surface on the first rod member, the seating surface on the second rod member being depressd relative to the threads on the threaded external surface and relative to the second surface and being disposed between the threaded external surface and the second surface and extending to a level no greater than the threaded external surface, and
   ring means seated between the seating surfaces on the first and second rod members and disposed relative to the seating surfaces to exert against the seating surfaces oppositely directed forces which pre-stress the threads of the first and second rod members with a force which is greater than the maximum cyclic stress imposed upon said rod members.
2. The device of claim 1 wherein
   said ring means comprises
      a plurality of separate sections, each having
         first and second mating surfaces disposed in cooperative relationship with said seating surfaces.
3. The combination of claim 2 wherein the threaded bore in the first rod member is defined by an axis and
   said seating surfaces are formed at acute angles, relative to the axis of the bore in said first rod member, greater than the sticking angle between said ring means and said rod members.
4. In combination in a rod joint pre-stressed to eliminate fatigue due to cyclic stress imposed upon the rod joint,
   a first member having
      an external surface and
      a threaded bore and
      a seating surface disposed adjacent to one end of the threaded bore and extending outwardly from the bore,
   a second member having
      a threaded external surface having threads cooperative with the threaded bore in said first member and having a second surface displaced from the threaded external surface and having the same external dimensions as the threaded external surface and having a seating surface disposed adjacent an end of the threaded external surface and between the threaded surface and the second surface and depressed relative to the threaded external surface and the second external surface, and ring means seated between said seating surface and exerting against such seating surfaces oppositely directed forces which generate against the threads on the first and second members stresses greater than the cyclic stresses imposed upon the first and second members.

5. The apparatus of claim 4 wherein the threaded bore is defined by an axis and the seating surface on the first member is angularly oriented relative to the axis of said bore, and said ring means includes an angularly oriented surface mating with the angularly oriented seating surface on the first member.

6. The apparatus of claim 5 wherein the seating surface on the second member is angularly oriented relative to the axis of the bore and the ring means includes an angularly oriented surface mating with the angularly oriented seating surface on the second member.

7. The apparatus of claim 6 wherein said ring means are formed by at least a pair of circumferentially oriented elements constructed to be pressed against each other as the ring means are pressed against the angularly oriented seating surfaces of the first and second members.

8. In combination in a rod joint pre-stressed to eliminate fatigue due to cyclic stress imposed upon the rod joint, a plurality of elements disposed circumferentially relative to one another to define a ring, said ring having at one side a surface oriented at a predetermined angle, a first elongated member having an external surface, a bore defined by an internal wall, a thread extending along the internal wall of said bore, and first seating means extending from said bore outwardly from the thread near one end of said thread for abutting communication with the ring, and a second elongated member having a first external wall and having a thread extending along the first external wall and having a second external wall displaced from the first external wall and having substantially the same external dimensions as the first external wall and second seating means disposed between the first and second external walls and depressed relative to the first and second external walls and extending about said second member adjacent one end of the thread thereon, a particular one of said seating members on said first and second members having a surface oriented at an angle complementary to said surface on said ring elements for receiving the latter thereagainst, the tangent of the angle between said ring elements and the bore being greater than the coefficient of friction between said ring elements and said one particular one of said seating means.

9. The apparatus of claim 8 wherein said bore has an open end and said plurality of ring elements are disposed between said first and second seating means adjacent the open end of said bore.

10. The apparatus of claim 8 wherein said bore has an open end and said plurality of ring elements are installed between said first and second seating means adjacent the end of the thread in said bore distal from the open end of the bore.

11. The apparatus of claim 8 wherein said particular one of said seating means comprises a circumferential groove depressed from the thread on the member providing said seating means and having a depth substantially equal to the root depth of the thread on such member.

12. In combination in a rod joint pre-stressed to eliminate fatigue due to cyclic stress imposed upon the rod joint, a first element having an external surface and having near one end a threaded section and a first ring-seating surface adjacent said threaded section and extending in the direction of the threads in the threaded section to a level no greater than the external surface, a second element having near one end a threaded section disposed in cooperative relationship with said threaded section in said first element and a second section displaced from the threaded section and having the same dimensions as the threaded section and a second ring-seating surface disposed between the threaded section and the second section and displaced from the first ring seating surface in the direction of the depths of the threads on the threaded section of the second element and defined by recess means formed in the surface of said second element, and means defining a ring disposed between the first and second ring-seating surfaces and disposed relative to the first and second ring seating surfaces to produce, against the threads on the first and second elements, pre-stressing forces which are greater than the cyclic stresses imposed upon the first and second elements.

13. The combination of claim 12 wherein said recess means is formed on the external surface of said second element and the threaded section on the first element is female and the threaded section on the second element is male.

14. The combination of claim 12 wherein said recess means is formed on the internal surface of said second element and the threaded section on the first element is male and the threaded section on the second element is female.

15. The combination of claim 12 wherein said second element is, with the exception of said threaded section and said recess means, of substantially constant cross-section in the vicinity of the joint thus formed.

16. The combination of claim 12 wherein the seating surfaces of the first and second elements are sloped and the surfaces of the ring means abutting the seating surfaces of the first and second elements are correspondingly sloped.

* * * * *